Nov. 26, 1929.  H. A. HAMM ET AL  1,737,371
SAW TOOTH ROOF STRUCTURE
Filed May 18, 1925  2 Sheets-Sheet 1
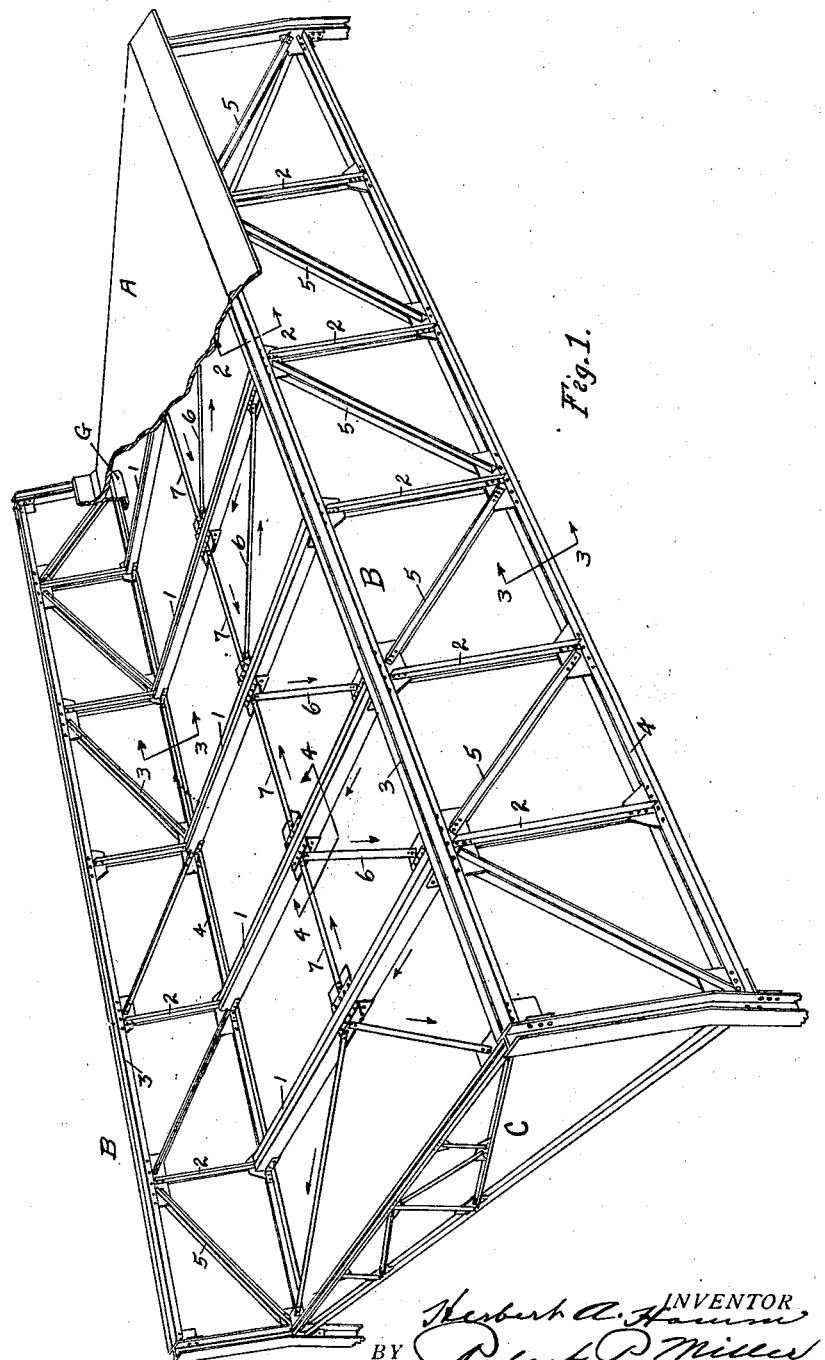

Nov. 26, 1929.　　　H. A. HAMM ET AL　　　1,737,371
SAW TOOTH ROOF STRUCTURE
Filed May 18, 1925　　　2 Sheets-Sheet 2
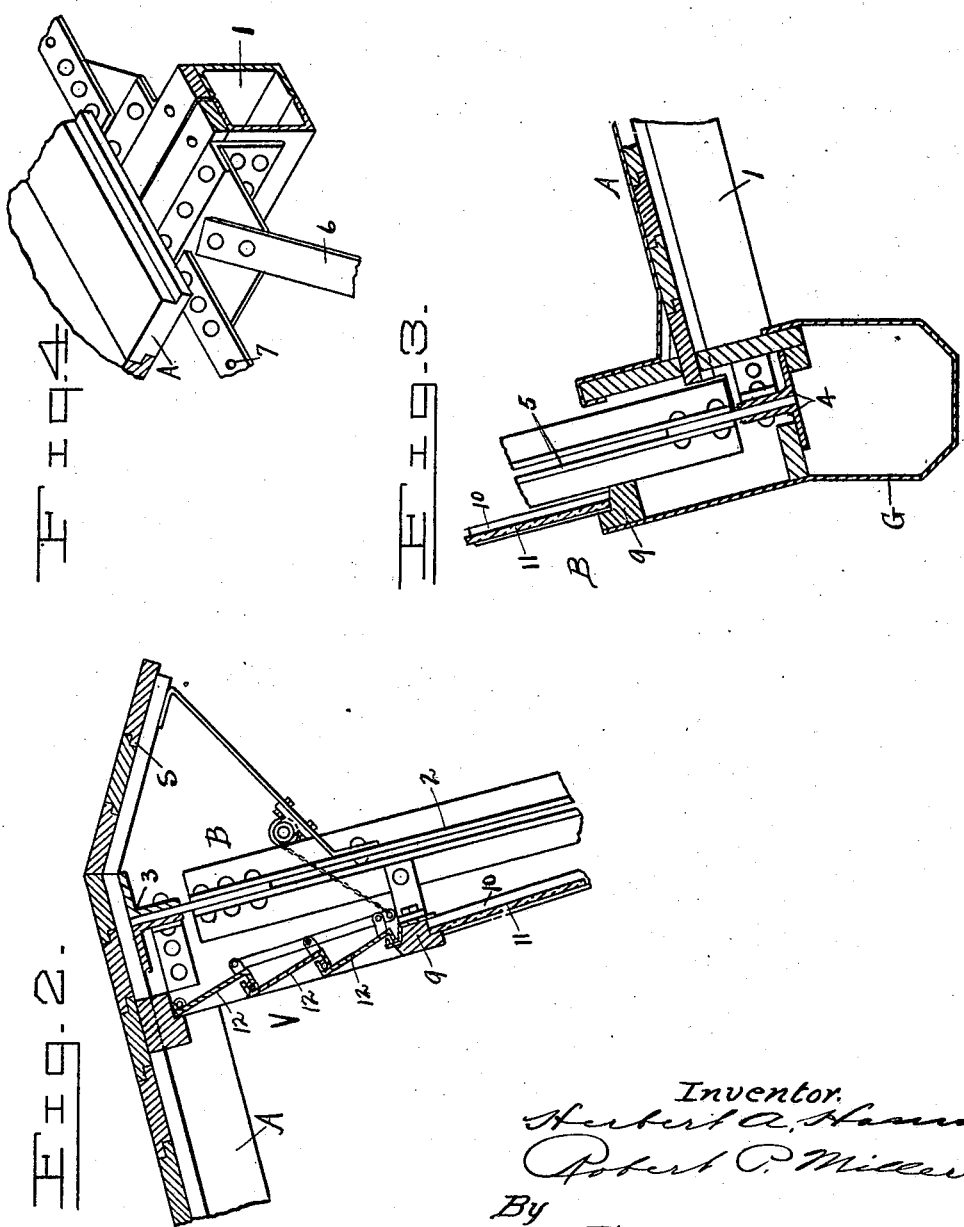
Inventor.
Herbert A. Hamm
Robert P. Miller
By
Attorney.

Patented Nov. 26, 1929

1,737,371

UNITED STATES PATENT OFFICE

HERBERT A. HAMM, OF PASADENA, AND ROBERT P. MILLER, OF SAN GABRIEL, CALIFORNIA

SAW-TOOTH ROOF STRUCTURE

Application filed May 18, 1925. Serial No. 31,117.

Our invention relates to improvements in saw tooth roof construction and is designed to eliminate certain serious objections now present in such structures and particularly when said structures are to be used for purposes where it is necessary to have as little dirt and dust around as possible.

Among the salient objects of our invention are: to provide a structure of the character referred to in which there are no projecting ledges, lips, flanges, cross members, or the like, having surfaces to catch dust, dirt, lint and the like; to provide a structure of the character referred to with special flat brace members adapted to be placed flatwise against the roof and so positioned and related to the saw tooth structure that they thoroughly brace said structure and prevent spreading without the usual tie rods or transverse brace members which afford dust and lint catching surfaces; to provide in such a structure an arrangement wherein the glass in the saw tooth sections of the roof are on the inside of the frame structure of each saw tooth section; to provide in such a structure an inside gutter; to provide rafter members formed of channel irons set with their flanges brought together edge to edge, thus placing the flanges within the rafter and leaving the rafter smooth and free of any flanges or other dust catching ledges; to provide in connection with such a construction ventilating means capable of being manipulated from the inside and positioned to be sheltered and protected so as to prevent rain and wind from entering the inside of the structure; and, in general, to provide a structure of the character referred to which is practical, efficient and free on the inside from the usual projections, ledges and surfaces which form objectionable dirt collectors, and from which dirt constantly falls to damage the contents of the building.

In order to further explain our invention, we have illustrated the same on the accompanying sheets of drawings, which we will now describe.

Figure 1 is a perspective view of one part of a saw tooth roof embodying our invention, with parts broken away to show the inside construction and arrangement;

Figure 2 is a fragmentary sectional view taken on line 2—2 of Fig. 1;

Figure 3 is a sectional view taken on line 3—3, of Fig. 1; and

Figure 4 is a sectional view taken on line 4—4 of Fig. 1.

Referring now in detail to the drawings, A, designates what we will refer to herein as the cover roof sections, and B, the light and ventilating sections, the two together constituting one saw tooth section, any number of which can be embodied in a complete saw tooth roof structure.

In such saw tooth roof structures as they are now constructed, the lower edge of the cover roof section, A, is connected to the lower edge of the light and ventilating section, B, by tie members or by triangular frame structures, similar to our end members, designated C, but which we use in our construction only at each end, over the end wall, as will be clear from the drawing, except in cases where walls are designed to take the places of these end members.

Our rafters are constructed of two channel irons, set with their flanges edge to edge, forming a box-like structure in cross section, said rafters being designated as 1, these being shown spaced apart in the cover roof section A. At their lower ends they are suitably anchored on top of a wall structure, or on the lower chord 4 of the light and ventilating section, B, as indicated. At their upper ends, said rafters are secured to the upper chord members, 3, of the light and ventilating section, B, as indicated in detail.

The light and ventilating sections, B, are each made up of a top chord member 3, a lower chord member, 4, vertical web members, 2, 2, and diagonal web brace members 5, 5, and together these constitute a truss, and this, with the windows and ventilating means, constitutes one of the light and ventilating sections B of our roof structure.

Instead of connecting the lower chord 4, of said truss, to the lower chords of similar trusses, we have conceived the idea of using a series of brace or tie members, designated, 6, 6, of flat steel, placed up under the cover roof section, A, and secured thereto flatwise, and secured at their upper ends near the top chord members, 3, to the upper end of the rafters, 1, 1, and at their lower ends secured to the rafters, 1, 1, intermediate their ends, and at which point there is placed a cross connecting flat member, 7, in each cover roof section A. These brace or tie members, 6, 6, at opposite sides of a center, designated 8, are parallel with each other, but diagonal from one rafter to the next adjacent rafter. The strain which would result from the tendency of the roof sections, A and B, to spread at their lower edges, is taken by these diagonal tie members, 6, 6, and is eventually transferred to the end members of the roof structure. The line of the strain transmission is indicated by small arrows along the members taking said strain, and can be followed readily. This eliminates intermediate cross tie members or triangular members set in the angle of the roof sections A and B, at intervals, between the opposite ends of the roof, as is usually done, and thereby eliminates many flanges, cross members and ledges which would catch much dust and lint, one of the main objects of our new and special construction and arrangement.

The covering of the roof section A, is shown to be wood, but it is understood that any suitable covering material can be used over the rafters, 1, 1, and the flat brace members, 6, 6, and said rafters and brace members can be placed against said covering, substantially as shown, or in any other manner to cover as much dirt catching surface as possible.

In the light and ventilating section, B, horizontal sash frame members, 9, 9, are placed, connected by vertical sash frame members, 10, 10, within which glass, 11, 11, is placed, and this window structure, it will be seen, is inside of the frame members 3, 4, 2, 2, and 5, 5, thus placing said frame members of the section B, outside of the windows which furnish the light and eliminating said frame members as dust and dirt catchers inside the structure.

Above the window structure, we have placed ventilating means, designated, V, and consisting of a plurality of hinged members, 12, 12, adapted to close together, as indicated in full lines, or to be opened at will, said members being manipulated by any suitable mechanism from the inside of the structure.

Another important feature of our structure is the provision of an inside gutter, designated, G, and placed around the lower edge of the light and ventilating section, B, as clearly indicated. This provides a smooth construction inside, and also provides means for catching and carrying off all the water, dirt and débris which may gather therein from the roof section, A, or from the windows, it being understood, of course, that said gutters extend to the ends of the structure, and that there is one for each saw tooth section.

We have also shown an eye-brown structure, S, at the juncture of the roof sections A and B, projecting down over the top part of the windows and over the ventilating means, as will be clear from the drawings, but this is not submitted as a part of the invention included herein.

It will be understood from the foregoing description, taken with the drawings, that we have an inside structure free from projecting ledges, flanges, lips, cross rods and beams which catch dust and dirt and lint, and which are very objectionable in laundry buildings, textile plants, bakeries, food packing plants, paint shops where fine work is done, and in many other structures where these things must be eliminated.

We have accomplished this by providing a new bracing arrangement flat up against the roof structure, as herein described; by placing the windows and ventilating means inside of the frame structure, as shown and described; by providing an inside gutter, and by providing a form of rafter which is free of flanges or lips to catch dust. This gives a maximum of smooth interior construction, with a minimum of dust catching surfaces, and when thoroughly painted it results in a most desirable interior condition.

While we have shown and described in detail one practical embodiment of our invention for illustrative purposes, we are aware that changes in details of construction and arrangement can be made without departing from the spirit of the invention, and we do not, therefore, limit the invention to the showing made, except as we may be limited by the hereto appended claims.

We claim:

1. In saw tooth roof construction, in combination, a cover roof section and a light section joined along their upper edges at an angle, said cover roof section being composed of spaced rafter members, a top chord member connecting the upper ends of said rafters, said rafters being connected to each other by flat connecting members, and diagonal brace members from the juncture of said flat connecting members with said rafters to the top chord member at the next rafter, said diagonal brace members at opposite sides of a selected rafter being oppositely disposed and all diagonal brace members on each side of said selected rafter being parallel with each other, said rafters being formed of channel irons with their flanges together to form a box-like structure in cross section and said brace members being of flat material, whereby to eliminate ledges and the like, and end tie members over the end supporting wall structures to tie said cover roof section and said light section together, substantially as shown and described.

2. In a saw tooth roof construction, rafters made of channel iron secured together with their edges meeting to form a box structure in cross section without projecting flanges or ledges, flat brace members connecting said rafters in a plane next adjacent the roof covering, a roof covering flatwise upon said box rafters and said brace members, substantially as shown.

3. In a roof construction, rafters each made of two channel irons secured together with their flange edges contiguous to each other to form a box in cross section without projecting flanges or ledges, diagonally positioned flat brace members connecting said rafters in the plane of their top surfaces, cover members flatwise upon said rafters and said flat brace members, some of said brace members being in one direction and some in the opposite direction, and a light and ventilating roof section supporting the upper ends of said rafters, substantially in the manner illustrated.

Signed by HERBERT A. HAMM at Los Angeles, California, this 30th day of April, 1925.

HERBERT A. HAMM.

Signed by ROBERT P. MILLER at Philadelphia, Pennsylvania, this 8th day of May, 1925.

ROBERT P. MILLER.